No. 682,687. Patented Sept. 17, 1901.
S. HAMBLEN.
WHEEL FOR BICYCLES.
(Application filed Oct. 29, 1900.)
(No Model.)
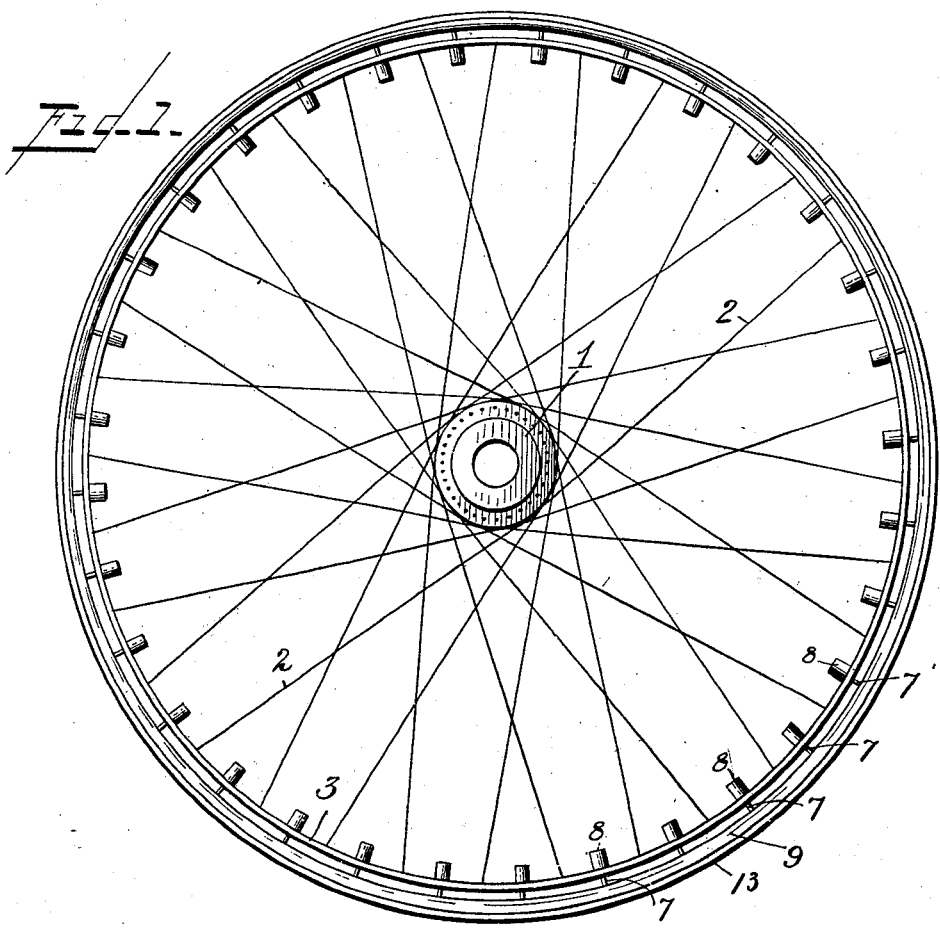
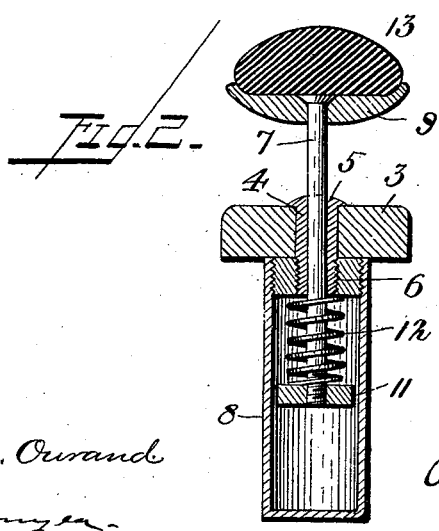
Inventor:
Samuel Hamblen,
By Burton T. Doyle,
his Attorney.
Witnesses:
Franck L. Ourand
E. P. Bunyan

UNITED STATES PATENT OFFICE.

SAMUEL HAMBLEN, OF HOT SPRINGS, ARKANSAS.

WHEEL FOR BICYCLES.

SPECIFICATION forming part of Letters Patent No. 682,687, dated September 17, 1901.

Application filed October 29, 1900. Serial No. 34,762. (No model.)

*To all whom it may concern:*

Be it known that I, SAMUEL HAMBLEN, a citizen of the United States, residing at Hot Springs, in the county of Garland and State of Arkansas, have invented certain new and useful Improvements in Wheels for Bicycles, of which the following is a specification.

My invention relates to wheels designed for use on bicycles or other light vehicles; and one object of the same is to provide a durable, efficient, and inexpensive wheel which will take the place of the pneumatic tire in present use.

Another object of my invention is to provide a spring-tire wheel which may be readily adjusted to give greater or less resiliency to its bearing upon the ground.

I attain these objects by means of the construction shown in the accompanying drawings, in which—

Figure 1 is a side view of a wheel made in accordance with my invention. Fig. 2 is a sectional view taken through the tire, rim, and spring-bolt cup.

Like numerals of reference designate like parts in both views of the drawings.

In said drawings the numeral 1 designates the hub of the wheel, which may be of ordinary or any well-known construction, and 2 designates the wire spokes secured to said hub at one end, the opposite ends of said spokes being attached in any suitable manner to a metal rim 3, which is perforated at suitable intervals, and passing through these perforations in rim 3 is a metal bushing 4, which is provided with a head 5 and exteriorly screw-threaded at 6. A nut is fitted to the threaded portion 6 of the bushing 4, and this nut is also threaded upon its periphery to fit the interior screw-threads of a bolt-cup 8. The tire of the wheel consists of a steel rim 9, having a rubber tire properly secured therein. Said rim 9 is provided with a suitable number of holes through it, and bolts 7 are passed through these holes, said bolts being countersunk within the rim and the opposite ends of the bolts being passed through the bushing 4 and into the bolt-cup 8. A nut 11 is fitted to the end of the bolt 7, and a spiral spring 12 encircles the bolt between the nut and the end of the bushing. This nut may be adjusted to regulate the stress of the spring to give more or less resiliency to the rubber tire 13, as will be readily understood on reference to the drawings. It will be understood that as many of the bolts, springs, and cups may be used as desired for wheels of different characters and that either wire or wooden spokes may be used.

It will be obvious from the foregoing that a wheel constructed as described has many advantages in the way of durability, permanency, cheapness of construction, and ease of adjustment.

Having thus fully described my invention, what I claim is—

A vehicle-wheel consisting of an outer and an inner rim, the outer rim having a rubber tire fitted thereto, a series of metal bushings extending through openings in said inner rim, nuts on the threaded ends of said bushings, bolts passing through the outer rim and through the bushings, springs encircling the bolts, nuts on the ends of the bolts for adjusting the stress of the springs and detachable cups covering the springs, bolts and nuts, said cups being interiorly threaded to fit the threaded peripheries of the nuts on the ends of the bushings, substantially as described.

In testimony whereof I affix my signature in presence of two witnesses.

SAMUEL HAMBLEN.

Witnesses:
P. J. DUGAN,
J. A. SMITH.